(12) United States Patent
Seki et al.

(10) Patent No.: US 6,450,296 B1
(45) Date of Patent: Sep. 17, 2002

(54) BREATHER STRUCTURE FOR A FINAL REDUCTION GEAR EQUIPPED WITH A DIFFERENTIAL

(75) Inventors: Bunzo Seki; Akio Senda, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 63 days.

(21) Appl. No.: 09/654,057

(22) Filed: Sep. 1, 2000

(30) Foreign Application Priority Data

Sep. 2, 1999 (JP) .......................... 11-249376

(51) Int. Cl.[7] .............................. F16H 57/02
(52) U.S. Cl. .................... 184/6.12; 74/606 R
(58) Field of Search .................. 184/11.1–11.5, 184/6.12, 6.23, 59, 13.1; 74/606 R

(56) References Cited

U.S. PATENT DOCUMENTS

| | | | | |
|---|---|---|---|---|
| 3,428,400 A | * | 2/1969 | Engle et al. ............... | 184/11.1 |
| 3,529,698 A | * | 9/1970 | Nelson ...................... | 184/11.2 |
| 4,595,118 A | * | 6/1986 | Azuma et al. ............ | 74/606 R |
| 5,297,452 A | * | 3/1994 | Gruss et al. ............... | 184/6.12 |
| 5,467,667 A | * | 11/1995 | Zaiser et al. ............... | 184/13.1 |
| 5,467,843 A | * | 11/1995 | Esch et al. ................ | 184/6.23 |
| 5,768,954 A | * | 6/1998 | Grabherr et al. ........... | 184/11.1 |
| 5,813,493 A | * | 9/1998 | Sloan et al. ............... | 184/6.12 |
| 6,135,241 A | * | 10/2000 | Ganguly et al. ........... | 184/11.1 |
| 6,180,277 B1 | * | 2/2001 | Tervo ........................ | 184/6.12 |
| 6,223,858 B1 | * | 5/2001 | Ubagai et al. ............. | 184/6.12 |
| 6,267,203 B1 | * | 7/2001 | Brissette et al. ........... | 184/6.12 |

* cited by examiner

*Primary Examiner*—Chong H. Kim
(74) *Attorney, Agent, or Firm*—Birch, Stewart, Kolasch & Birch, LLP

(57) ABSTRACT

A breather structure for a reduction gear in which a plurality of stop ribs are disposed within a housing. The stop ribs are disposed at nonuniform distances between successive ribs in order to prevent oil from entering a breather chamber of the housing. The relative spacing between successive ribs allows the breather structure to prevent oil traveling at varying speeds from entering the breather chamber. The ribs have an upper surface which is disposed at declining, or obtuse, angles with respect to an interior of the housing, and a lower surface which acts to receive oil rising from a bottom of the housing.

18 Claims, 12 Drawing Sheets

Fig. 6(a)
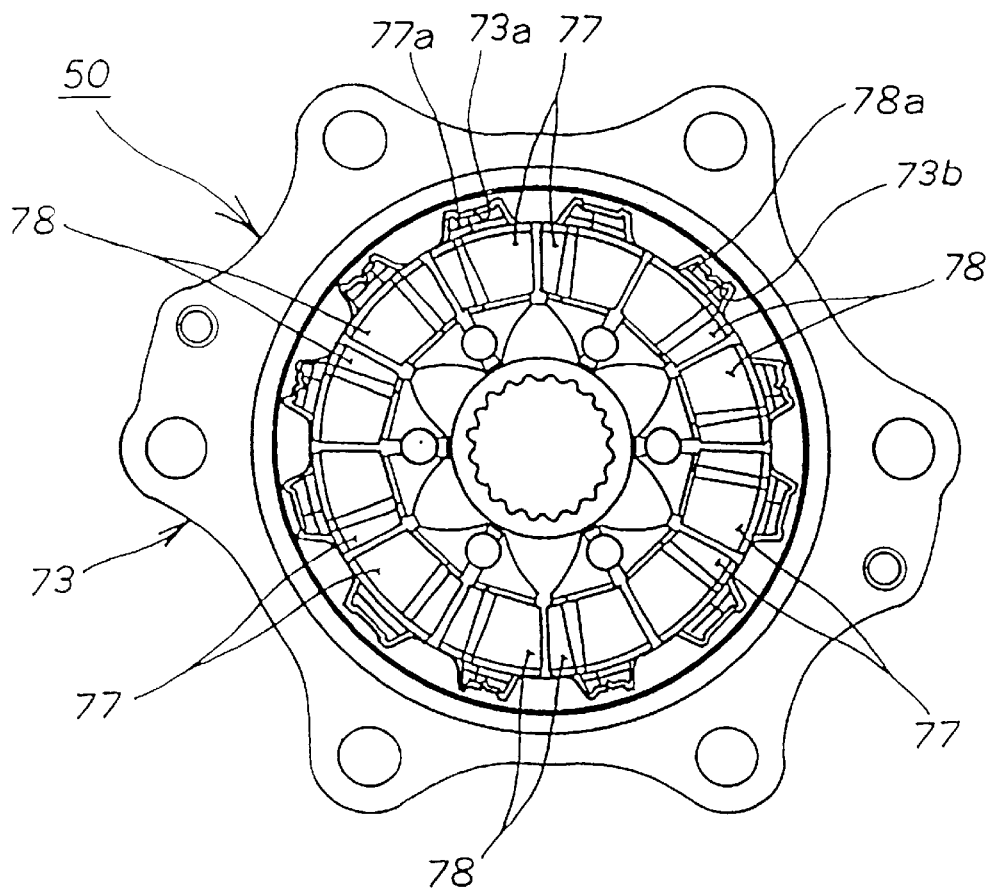
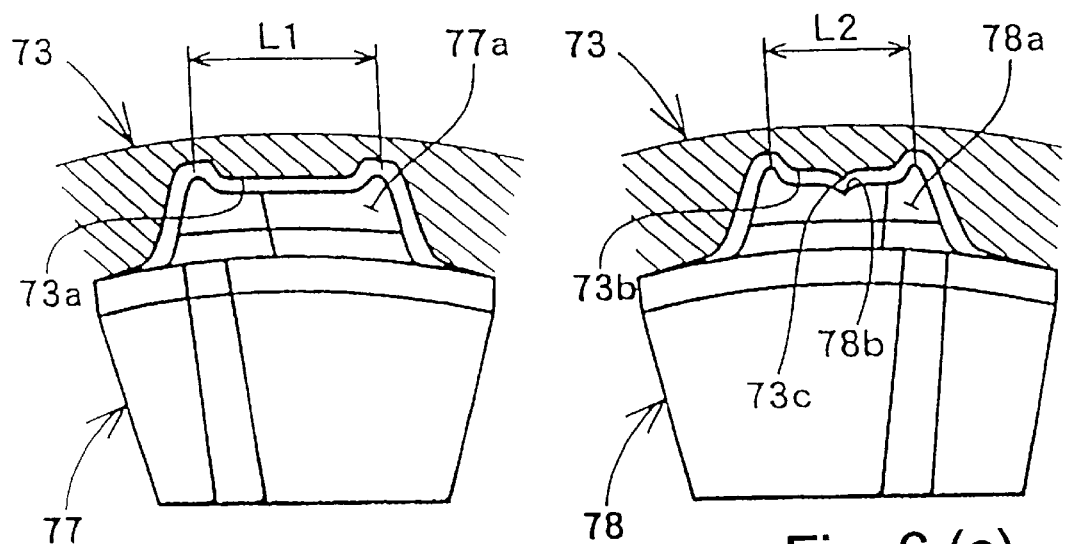
Fig. 6 (b)   Fig. 6 (c)

Fig. 9 (a)
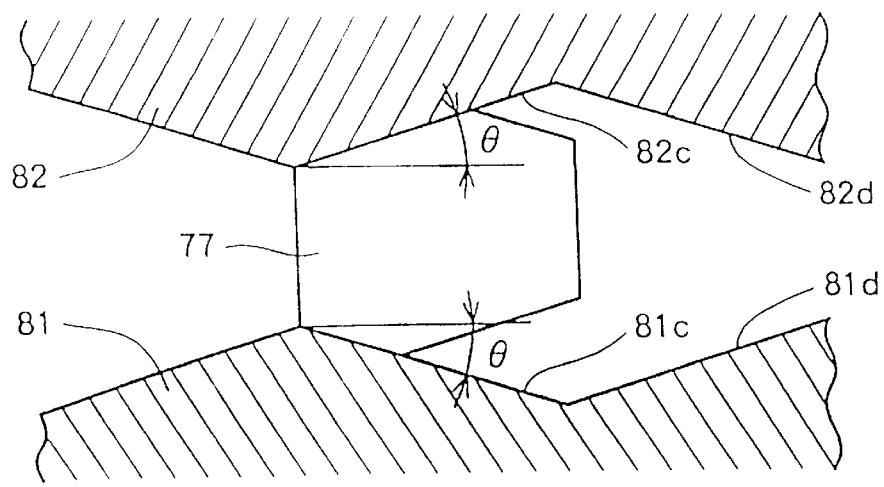
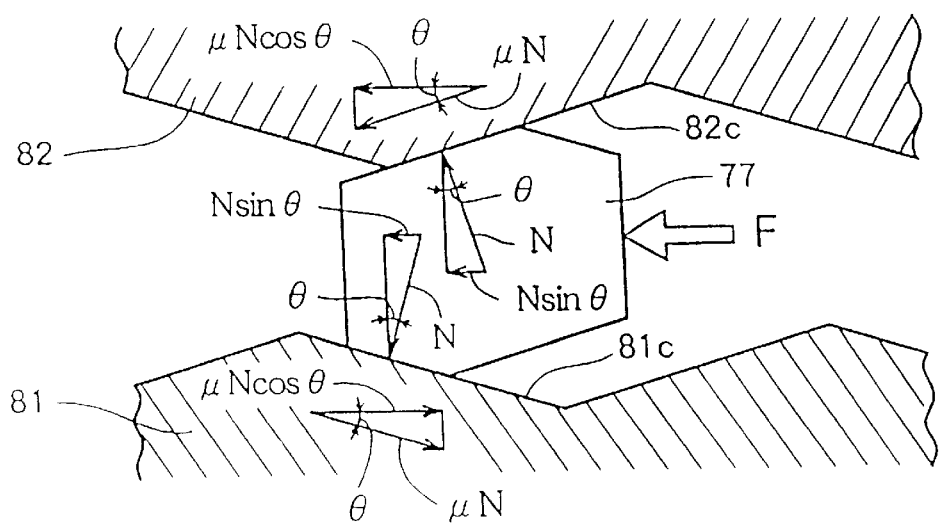
HIGH SPEED ROTATION
Fig. 9 (b)

BREATHER STRUCTURE FOR A FINAL REDUCTION GEAR EQUIPPED WITH A DIFFERENTIAL

CROSS-REFERENCES TO RELATED APPLICATIONS

This non-provisional application claims priority under 35 U.S.C. § 119(a) on Patent Application No. Hei-11-249376 filed in Japan on Sep. 2, 1999.

BACKGROUND OF THE INVENTION

1. Field of the Invention

The present invention relates to a breather structure for a final reduction gear equipped with a differential. In particular, the invention is addressed to a breather structure of reduced cost, reduced noise and durability, and which prevents oil leakage.

2. Background Art

A conventional gear box exists for storing a gear, a bearing, and lubricant. In the conventional gear box, a communication pipe-like breather structure prevents changes in internal pressure due to increasing temperature, so that the internal pressure is always made equivalent to the atmospheric pressure. This prevents oil leakage from a sealed part due to increasing internal pressure.

Such a system is disclosed in Japanese Utility Publication No. Sho. 57-51940 entitled "Final Reduction Gear." In FIG. 4 of this publication, a final reduction gear includes an air introducing slot 9A of an air breather 9 in a space surrounded by ribs 8, 8A on the inside of the rear cover 5. A shroud 10 is located on the rear cover 5 to prevent oil scattered by a rotating hypoid gear from entering the air introducing slot 9A and the upper surface of the rib 8A.

In FIG. 5 of the publication, another embodiment of a final reduction gear includes a packing 6, provided between the housing 4 and the rear cover 5. The packing 6 is formed as partly projecting so that oil is prevented from entering the air introducing slot 9A and the upper surface of the rib 8A.

According to the above technique, attachment of a shroud 10 to the rear cover 5 results in an increased number of parts. The parts include the shroud 10, a bolt for attachment, and so on. The increase in number of parts increases costs.

Also, when the packing 6 is formed as partly projecting, a thin packing that is less rigid is likely to vibrate, which results in increased noise and decreased durability.

Further, as the hypoid gear 1 rotates at a high speed, the amount of scattered oil increases and its velocity increases. Therefore, a larger amount of oil may enter the air introducing slot 9A or the upper surface of the rib 8A, through spaces between the rib 8A and the shroud 10, or between the rib 8A and the extension of the packing 6.

In view of the above, objects of the present invention include providing a breather structure for a final reduction gear having a decreased cost, less noise, increased durability, and which may prevent oil leakage.

SUMMARY OF THE INVENTION

In order to achieve the above objects, a final reduction gear, in which an upper part of a housing is made into a breather chamber, which is communicated to the outside via a breather pipe, and a differential is rotatably stored in a housing. A plurality of oil stop ribs are provided, extending toward the differential, on an inner circumferential surface of the housing, to prevent oil having been scooped by the differential from flowing into the breather chamber. The oil stop ribs may be provided at irregular intervals.

When the scooped oil is prevented from flowing into the breather chamber by the plurality of oil stop ribs formed on the inner circumferential surface of the housing, and the adjacent oil stop ribs are provided at irregular intervals, a place where the oil is to be accumulated is shifted from a place between adjacent oil stop ribs with a larger interval to a place between adjacent oil stop ribs with a smaller interval as the differential rotates at a higher rotation frequency. In this manner, an amount of oil to be blocked is gradually reduced.

As oil stop ribs are provided to the housing, the need to provide additional oil stopping parts to the housing is eliminated. This reduces the number of parts and suppresses noise or damage due to vibration.

Also, when adjacent oil stop ribs are provided at irregular intervals, an amount of oil to be blocked can be gradually reduced as the differential rotates at a higher rotation frequency, whereby the oil can be reliably prevented from flowing into the breather chamber.

The oil stopping ribs may be formed having upper and lower surfaces of differing shape. Specifically, the upper surface of the oil stop rib may be formed as declining, and may have a curvature, so that the blocked oil flows downward, and the lower surface thereof is formed as a receiver for directly receiving the rising oil.

The blocked oil flows downward along the declining upper surface of the oil stop rib, while the rising oil is received by the lower surface of the oil stop rib, which is formed as a receiving surface.

As a result, oil does not accumulate on the upper surface of the oil stop rib, and oil flow is blocked by the lower surface of the oil stop rib, so that the oil can accumulate in the lower part of the housing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 6(a)–6(c) are views of an input block of a differential according to the present invention;

FIGS. 9(a) and 9(b) are diagrams showing the operation of a differential according to the present invention;

DETAILED DESCRIPTION OF THE PREFERRED EMBODIMENTS

Figure 1:
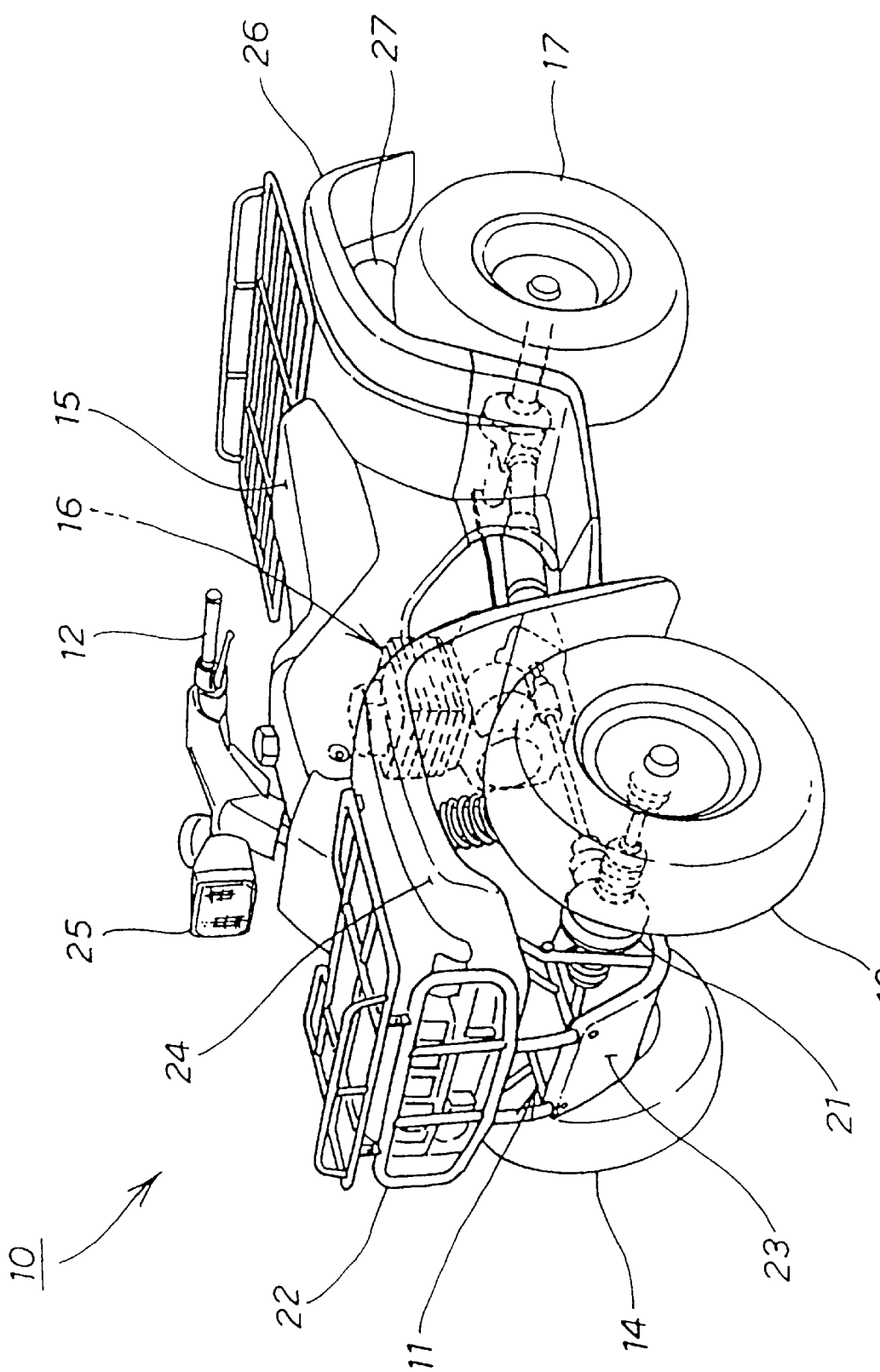
FIG. 1 is a perspective view of a saddled vehicle equipped with a final reduction gear according to the present invention.

FIG. 1 is a perspective view of a saddled vehicle equipped with a final reduction gear according to the present invention. The saddled vehicle 10 includes a handle 12 rotatably attached to a vehicle frame 11, front wheels 13, 14 (13 for a left front wheel, 14 for a right front wheel) steerably connected to the handle 12 via a steering device (not shown), and vertically movably attached to the vehicle frame 11 via an arm (not shown). A seat 15 is arranged on the upper part of the vehicle frame 11, and a power unit 16 comprising an engine and a transmission is arranged below the seat 15. Rear wheels 17, 18 (17 for a left rear wheel, 18 for a right rear wheel (not shown)) are driven, together with the front wheels 13, 14, by the power unit 16 via a power transmission mechanism. Reference numeral 22 denotes a front bumper, numeral 23 an under cover, numeral 24 a front fender, numeral 25 a headlamp, numeral 26 a rear fender, and numeral 27 a muffler.

Reference numeral 21 denotes a front final assembly as a final reduction gear, or one of the components of the power transmission mechanism. The front final assembly 21 incorporates a differential (described later), and is installed between the left front wheel 13 and the right front wheel 14.

Figure 2:
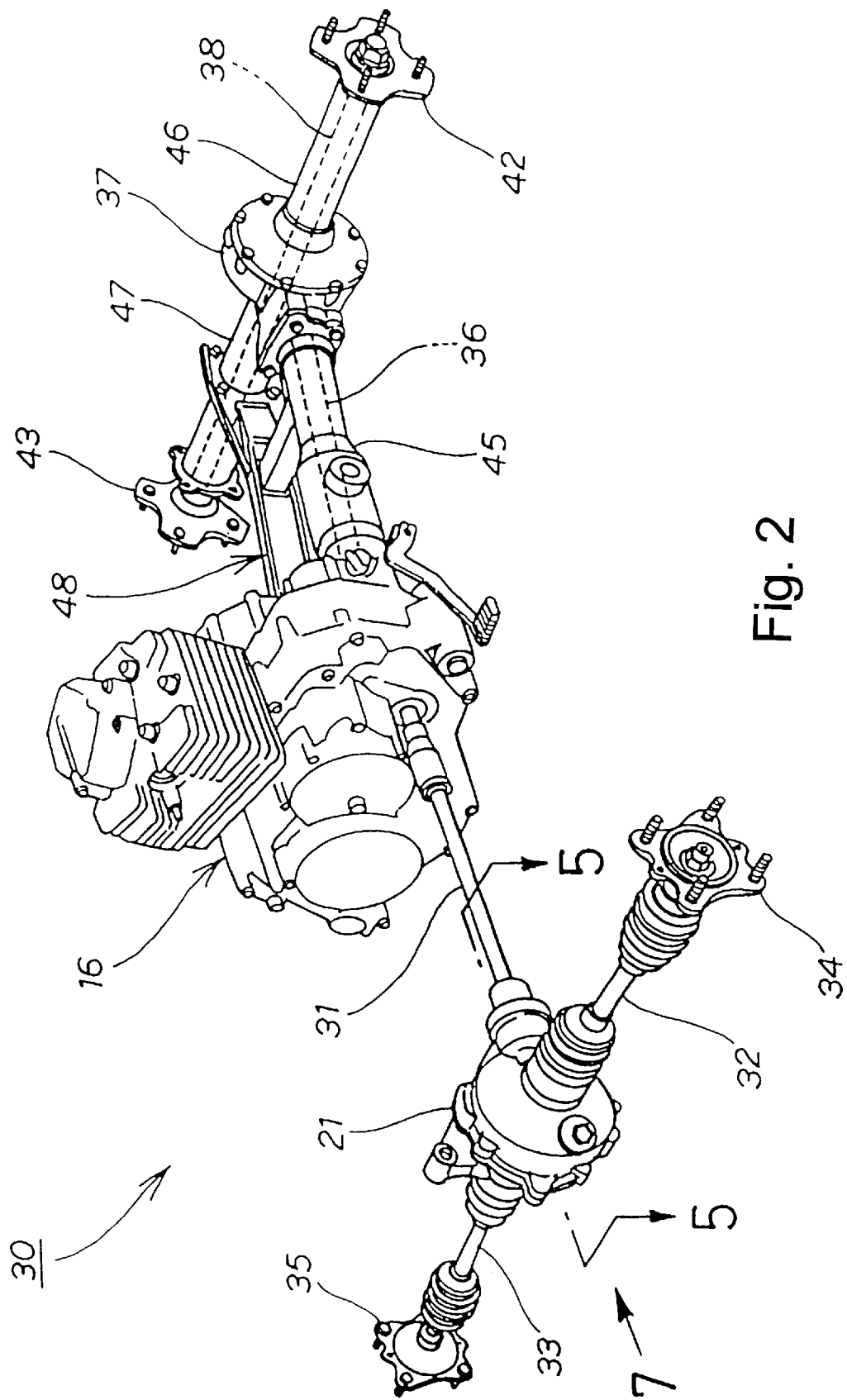
FIG. 2 is a perspective view of a power transmission mechanism of a saddled vehicle equipped with a final reduction gear according to the present invention.

FIG. 2 is a perspective view showing a power transmission mechanism of a saddled vehicle equipped with a final reduction gear according to the present invention. A power transmission mechanism 30 comprises a front propeller shaft 31 extending frontward from the bottom of the power unit 16, a front final assembly 21 connected to the leading end of the front propeller shaft 31, front drive shafts 32, 33 connected on the left and right sides of the front final assembly 21, hubs 34, 35 connected to the respective ends of the front drive shafts 32, 33, a rear propeller shaft 36 extending backward from the bottom of the power unit 16, a rear final assembly 37 connected to the trailing end of the rear propeller shaft 36, a rear drive shaft 38 penetrating the rear final assembly 37 in the left and right direction thereof, and hubs 42, 43 connected to the respective ends of the rear drive shaft 38. Reference numerals 45, 46, 47 denote tubes covering the rear propeller shaft 36 and left and right sides of the rear drive shaft 38. A supporting member 48 supports the tubes 45, 47.

The hubs 34, 35, 42, 43 are for attaching the hubs 34, 35, 42, 43 to the left front wheel 13, the right front wheel 14, the left rear wheel 17, and the right rear wheel 18, shown in FIG. 1, respectively.

Figure 3:
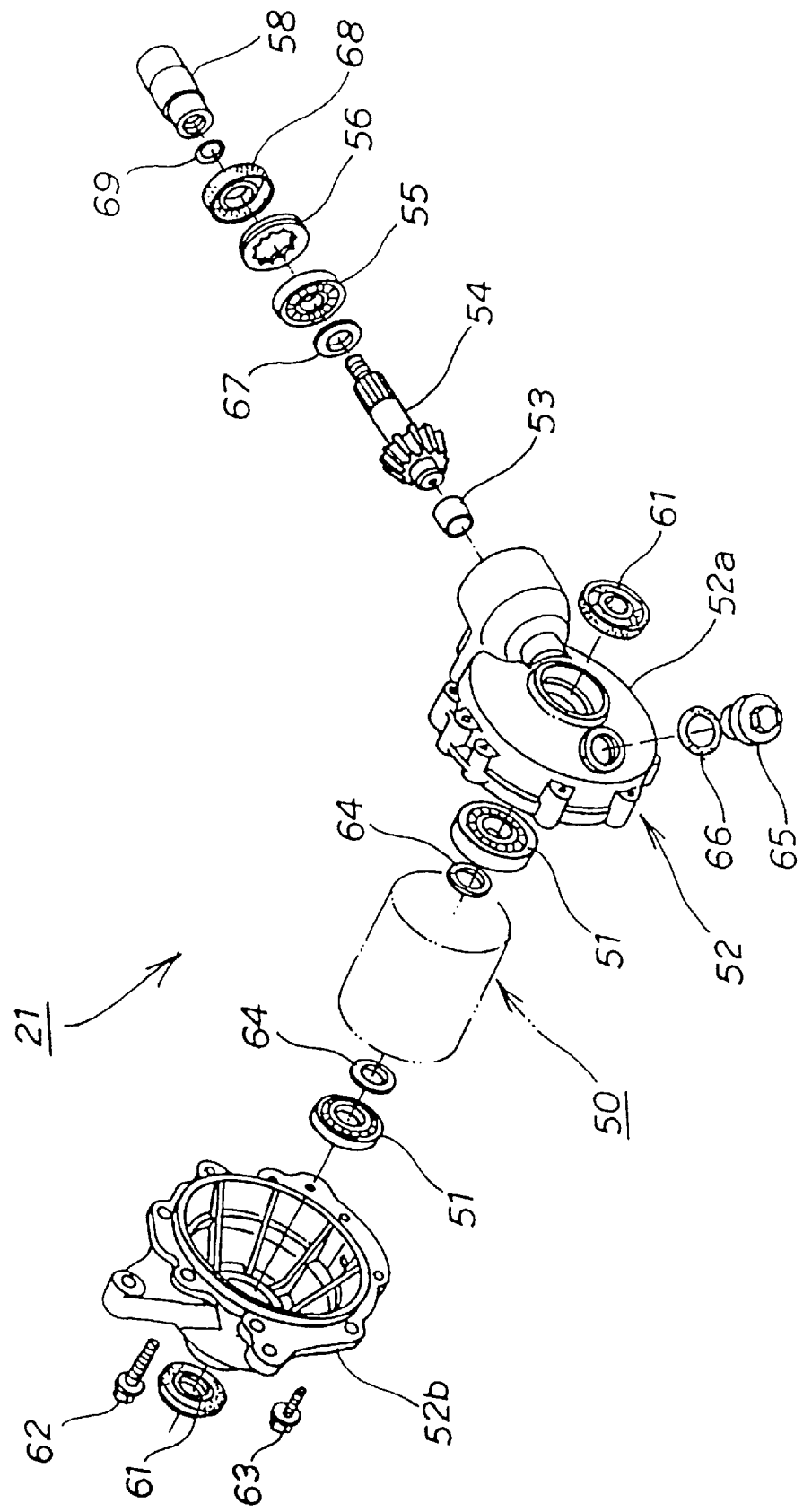
FIG. 3 is an exploded perspective view of a differential according to the present invention.

FIG. 3 is an exploded perspective view showing a differential according to the present invention. In FIG. 3, the front final assembly 21 comprises a differential case assembly 50 as a differential, a housing 52 for rotatably storing the differential case assembly 50 via the bearings 51, 51, a drive pinion 54 for insertion into the housing 52 from the rear side thereof via the bearing 53, a bearing 55 for rotatably installing the driving pinion 54 to the housing 52, a lock nut 56 for preventing displacement of the bearing 55, and a joint 58 to be installed on an end of the driving pinion 54.

In FIG. 3, reference numeral 52a denotes a housing body, 52b a housing cover, 61, 61 oil seals, 62, 63 bolts, 64, 64 spacers, 65 a maintenance hole plug, 66 an 0-ring, 67 a spacer, 68 an oil seal, and 69 an O-ring.

Figure 4:
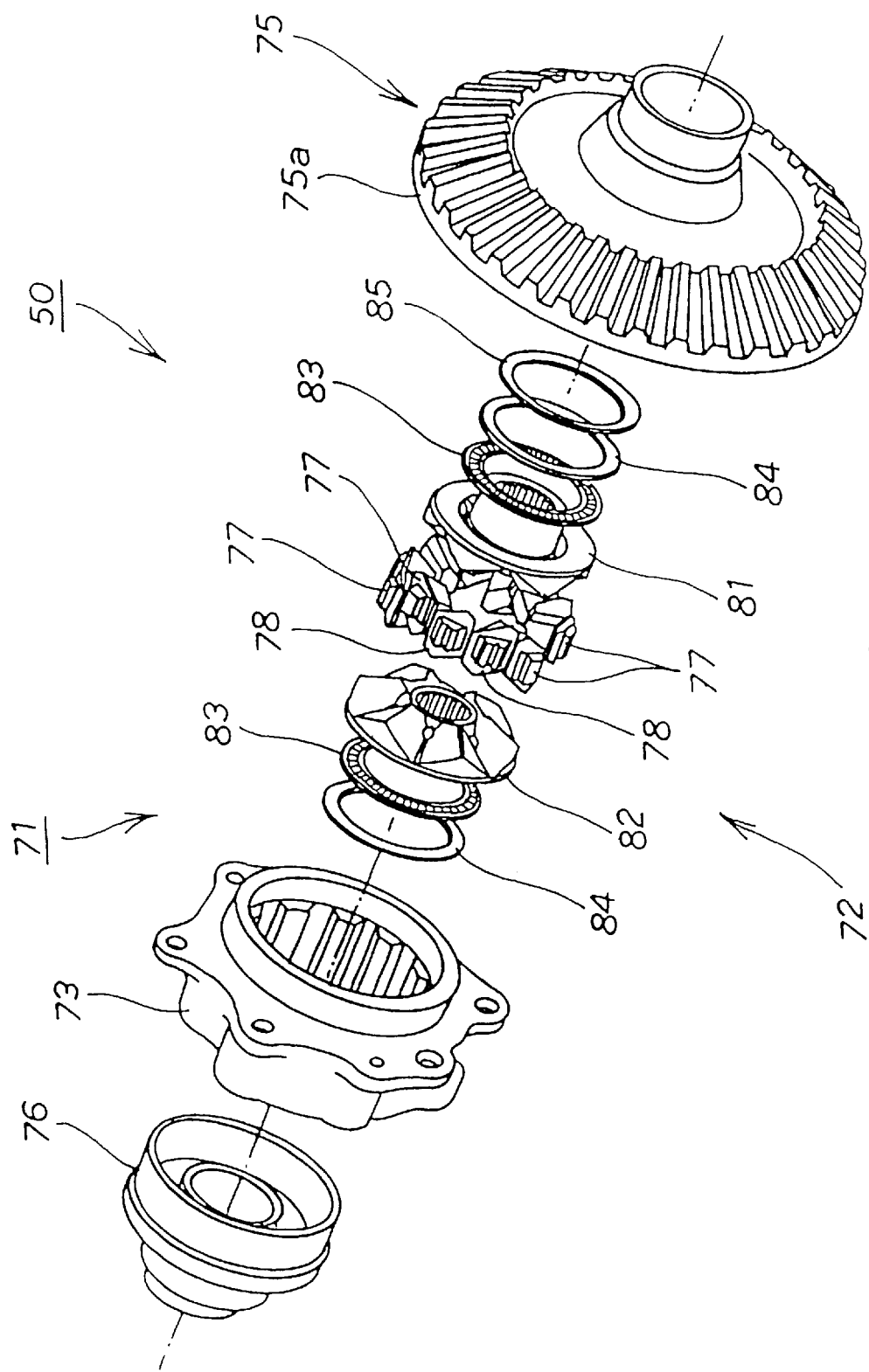
FIG. 4 is an exploded perspective view of a differential case assembly of a differential according to the present invention.

FIG. 4 is an exploded perspective view showing a differential according to the present invention, in which a differential case assembly 50 comprises a differential case 71 and a storage part 72 to be stored in the differential case 71.

The differential case 71 comprises a column-like case body 73, a ring-geared cap 75, in which a ring gear 75a is integrally formed on a left cap (described later) to be attached to one of the openings of the case body 73, and a right cap 76 to be attached to the other opening of the case body 73.

The storage part 72 comprises two types of input blocks 77, 78, for rotating integrally with the differential case 71, left and right output cams 81, 82 for sandwiching the input blocks 77, 78 so as to allow them to slide relative to each other, and capable of rotating independently due to a frictional force with the respective blocks, thrust bearings 83, 83, arranged adjacent to the left and right output cams 81, 82, thrust washers 84, 84, and a disk spring 85. The thrust bearings 83, 83 may be omitted.

Figure 5:
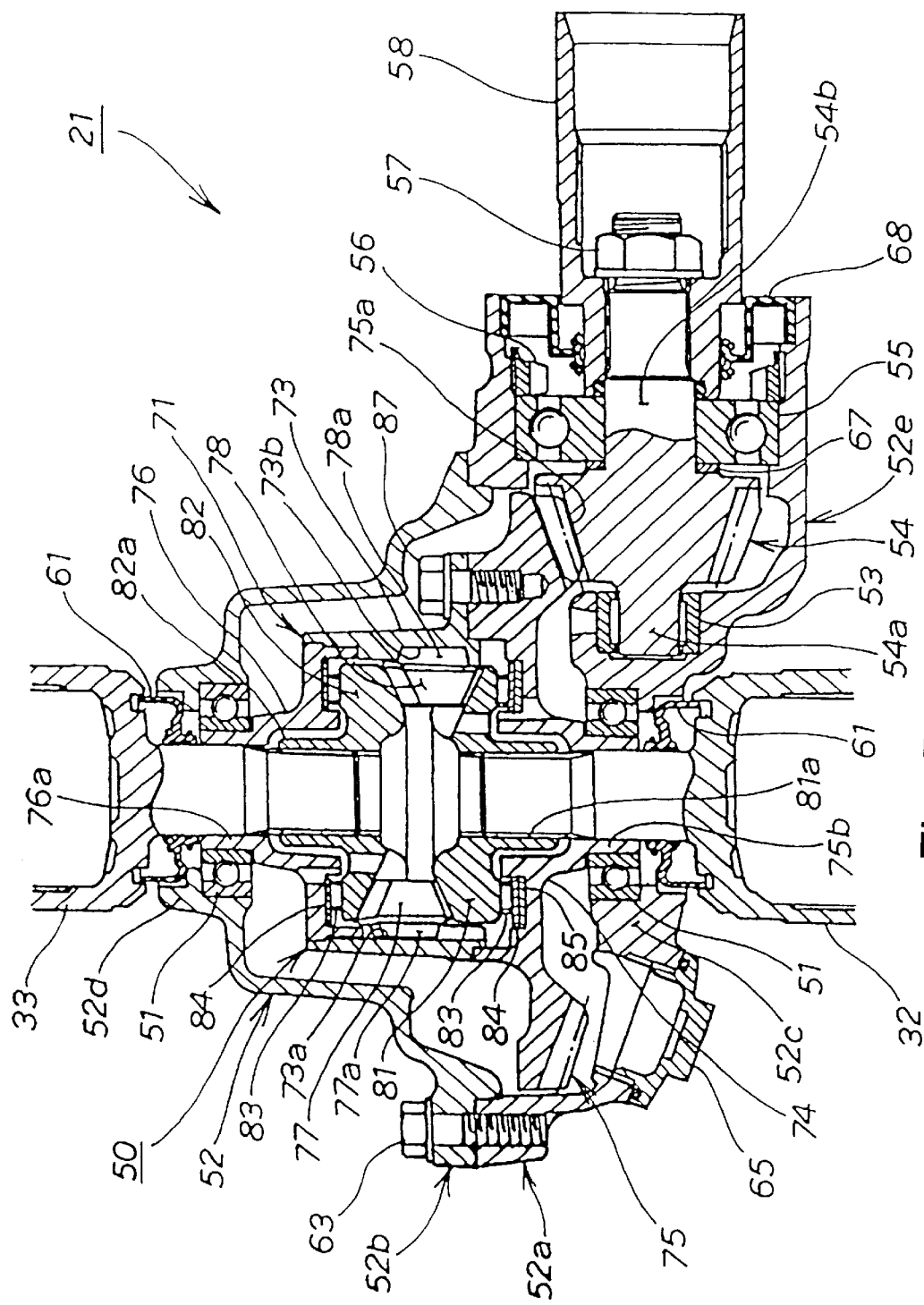
FIG. 5 is a cross sectional view of FIG. 2 along the line 5—5.

FIG. 5 is a cross sectional view of FIG. 2 along the line 5—5.

The front final assembly 21 is a device in which a differential case assembly 50 is assembled by forming a ring-geared cap 75 through integral formation of a ring gear 75a to a left cap 74. A left output cam 81 is provided in the inside of the ring-geared cap 75 via a disk spring 85, a thrust washer 84, and a thrust bearing 83. The case body 73 is installed to the ring-geared cap 75 by a bolt 87. Input blocks 77, 78 are arranged in the case body 73 in the circumferential direction so as to contact the left output cam 81, and a right output cam 82 is arranged so as to contact the input blocks 77, 78. A right cap 76 is provided adjacent to the right output cam 82 via a thrust bearing 83 and a thrust washer 84, and the right cap 76 is attached to the case body 73.

The front final assembly 21 is a device in which the housing 52 is assembled by attaching a column part 75b of the ring-geared cap 75 to a journal part 52c of the housing body 52a via a bearing 51. A cylinder part 76a of the right cap 76 is attached to the journal part 52d of the housing cover 52b via the bearing 51, and the housing cover 52b is attached to the housing body 52a by bolts 62 (see FIG. 3), 63 (only one is shown). The differential case assembly 50 is rotatably provided inside the housing 52.

The front final assembly 21 is a device in which the end 54a of a driving pinion 54 is attached in the inside of a rear cylinder part 52e of the housing body 52a via a bearing 53. The middle part 54b of the driving pinion 54 is attached to the rear cylinder part 52e via the bearing 55 to thereby cause the driving pinion 54 to be engaged with the ring gear 75a. A lock nut 56 is screwed into the inner circumferential part of the rear cylinder part 52e to thereby prevent displacement of the bearing 55. A joint 58 is attached to the trailing end of the driving pinion 54, and an oil seal 68 is provided between the inner circumferential part of the rear cylinder part 52e and the joint 58.

The input blocks 77, 78 each have convex parts 77a, 78a, which are fixed to axial slots 73a, 73b, formed on the inner surface of the case body 73, whereby the input blocks 77, 78 can rotate together with the case body 73.

The left and right output cams 81, 82 transmit a driving force to the left and right front wheels 13, 14 (see FIG. 1) by spline connecting the front drive shafts 32, 33 to the cylinder parts 81a, 82a, respectively.

The drive pinion 54 transmits a driving force from the power unit 16 (see FIG. 1) to the differential case assembly 50 by spline connecting the front propeller shaft 31 (see FIG. 2) to the joint 58.

As described above, in the differential case assembly 50 of the present invention a ring gear 75a is integrally formed on the left cap part 74, which is a part of the differential case 71.

With the above structure, the ring gear 75a is integrally formed on the left cap 74 of the differential case 71 so that the left cap part 74 and the ring gear 75a can be formed as a single part. A conventional bolt for connection is therefore unnecessary. In a conventional design, A case and a ring gear are different entities and require an attachment bolt. Thus, the number of parts can be reduced, and molding can be facilitated, as a result of which manufacturing costs can be reduced.

FIGS. 6(a) to (c) are diagrams explaining an input block of a differential according to the present invention.

FIG. 6(a) shows an internal state of the differential case assembly 50 with the ring-geared cap 75 (see FIG. 5) and the left output cam 81 both removed.

Input blocks 77, 78 are arranged alternately (every two blocks) in the circumferential direction such that convex parts 77a, 78a are fitted into the axis direction slots 73a, 73b, respectively, formed on the inner surface of the case body 73.

FIG. 6(b) is an enlarged diagram of a selected portion of FIG. 6(a), showing the case body 73 and the input block 77 in engagement with the case body 73.

The axis direction slot 73a is a slot having a substantially trapezoidal shape. The convex 77a is a part having a shape substantially analogous to the shape of the axis direction slot 73a. Here, the width of the upper part of the convex 77a is defined as L1.

FIG. 6(c) is an enlarged diagram of selected parts of FIG. 6(a), showing a case body 73 and an input block 78 in engagement with the case body 73.

The axis direction slot 73b is a slot having a substantially trapezoidal shape. The convex part 78a has a shape substantially analogous to the shape of the axis direction slot 73b. Here, the width of the upper part of the convex part 78a is defined as L2. That is, the upper width L2 differs from the upper width L1 in FIG. 6(b)—L1>L2.

Although L1>L2 is shown in FIG. 6(b) and (c), L1<L2 may be possible.

Also, the axis direction slot 73b has a projection 73c at the bottom thereof, and the convex 78a has a hollow 78b on the upper surface thereof, which corresponds to the above-described projection 73c.

Figure 7:
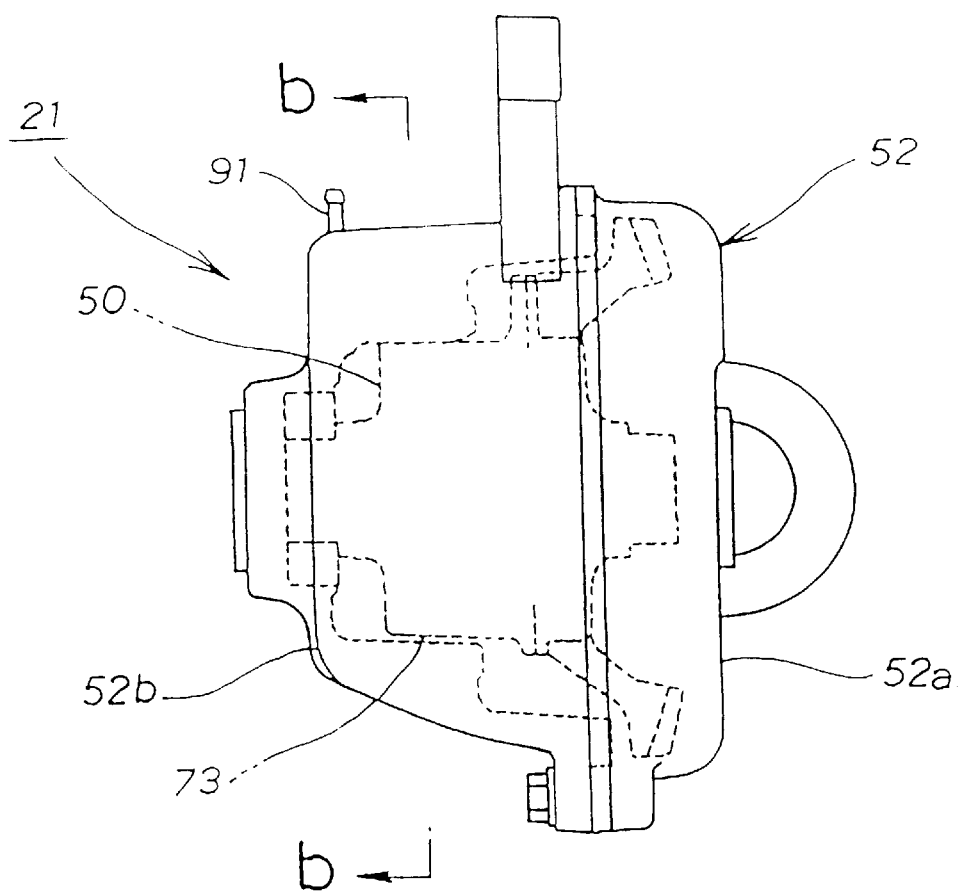
FIGS. 7(a) and 7(b) are views of a breather structure of a front final assembly equipped with a differential according to the present invention.
Figure 7:
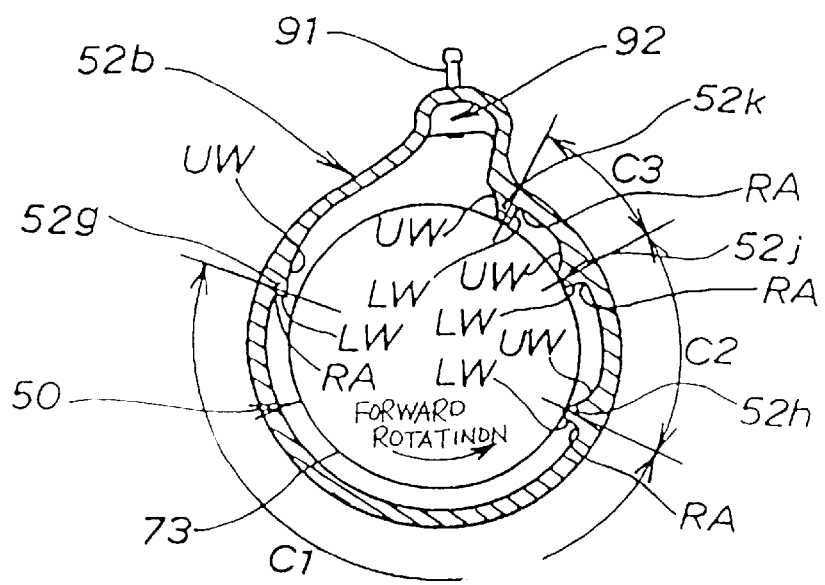

FIG. 7(a), (b) are diagrams illustrating a breather structure for a front final assembly equipped with a differential according to the present invention. FIG. 7(a) is a view in the direction of arrow 7 in FIG. 2, while FIG. 7(b) is a cross sectional view of (a) along line b—b.

In FIG. 7(a), the front final assembly 21 has a breather joint 91 on the upper part of the housing cover 52b, as a breather pipe for communicating between inside and outside of the housing 52.

In FIG. 7(b), the housing cover 52b has an upper part thereof formed projecting to form a breather chamber 92, and the breather joint 91 is attached on the wall in the upper part of the breather chamber 92.

A plurality of oil stop ribs 52g, 52h, 52j, 52k are formed with irregular intervals and substantially parallel to the rotation axis of the differential case assembly 50. The oil stop ribs 52g, 52h, 52j, 52k are formed on the inner surface of the housing cover 52b below the breather chamber 92. These oil stop ribs 52g, 52h, 52j, 52k are set close to the case body 73 of the differential case assembly 50.

The direction in which the differential case assembly 50 rotates when the associated vehicle runs forward is determined as a forward rotation direction, which is the direction of the arrow in the drawing.

The oil stop ribs 52g, 52h, 52j, 52k are formed such that the lower surfaces thereof, or walls LW, which are further from the breather chamber 92, rise substantially vertically with respect to the inner surface of the housing cover 52b, with corners RA having a small arc radius r1. The walls UW, which are closer to the breather chamber 92, are formed in an arc, having a large arc radius r2. In this embodiment, r2>r1.

The oil stop rib 52g is formed on the other side of the inner surface of the housing cover 52b, with the differential case assembly 50 intervening, from the surface where the oil stop ribs 52h, 52j, 52k are formed.

Respective intervals between the oil stop ribs 52g, 52h, 52j, 52k correspond to angles C1, C2, C3, respectively, wherein C1>C2>C3.

The relationship among the angles C1, C2, C3 in terms of degrees, represents a relationship in an amount of oil allowed to accumulate between adjacent oil stop ribs 52g, 52h, 52j, 52k.

The relationship between the respective amounts of oil accumulation may be stated as follows:

amount of oil accumulating between the oil stop ribs 52g,
      52h>amount of oil accumulating between the oil stop ribs 52h,
      52j>amount of oil accumulating between the oil stop ribs 52j,
      52k.

In the present invention, the breather structure of a front final assembly 21 equipped with a differential case assembly 50 is characterized by the fact that the upper part of the housing 52 is made into a breather chamber 92 which communicates with the outside via a breather joint 91, the differential case assembly 50 is rotatably accommodated in the housing 52, and a plurality of oil stop ribs 52g, 52h, 52j, 52k are formed on the inner circumferential surface of the housing 52, extending toward the differential case assembly 50. In this configuration, the oil scooped by the differential case assembly 50 is prevented from entering the breather 92. In addition, irregular intervals exist between adjacent oil stop ribs 52g and 52h, 52h and 52j, 52j and 52k.

In the above structure, when oil stop ribs 52g, 52h, 52j, 52k are provided on the housing 52, the need for additional oil stoppers on the housing 52 is eliminated. This reduces the number of parts and decreases cost. Also, as the oil stop ribs 52g, 52h, 52j, 52k are integrally formed on the housing 52, the oil stop ribs 52g, 52h, 52j, 52k can be prevented from vibrating, and from being damaged by vibration of the housing 52.

Also, in the breather structure of a front final assembly 21, the walls UW, LW are formed in different shapes. Specifically, the oil stop ribs 52g, 52h, 52j, 52k are formed such that the upper surface walls UW are formed declining so that blocked oil flows downward therealong, and the lower surface walls LW are formed as a receiver for directly receiving rising oil. The upper surface walls UW of the oil stop ribs 52g, 52h, 52j, 52k may have a curvature in order to facilitate the flow of oil to the lower surface walls LW. The upper surface walls are may also be at an angle with respect to vertical in order to downward facilitate oil flow.

FIGS. 8(a) to (d) schematic views of an input block and an output cam of a differential of the present invention, being developed in the circumferential direction. FIGS. 8(a) to (d) show chronological steps, in which the left output cam 81 moves leftward in the drawing, relative to the right output cam 82, as time passes.

Figure 8:
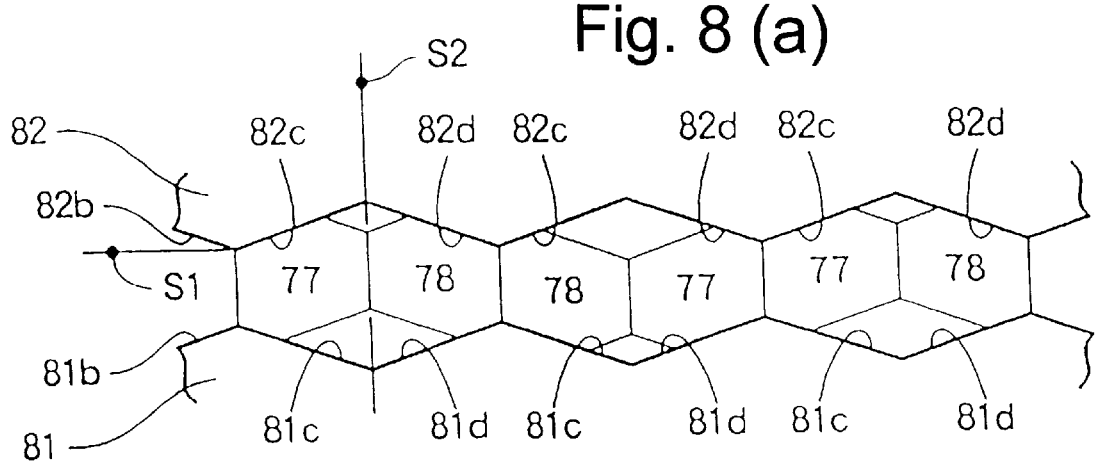
FIGS. 8(a)–(d) are views of an input block and an output cam of a differential according to the present invention, which are developed in a circumferential direction.
Figure 8:
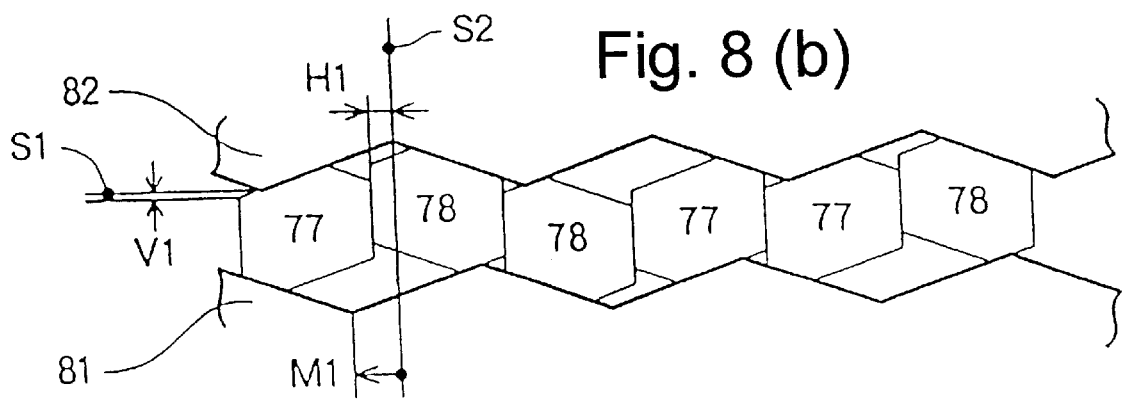
Figure 8:
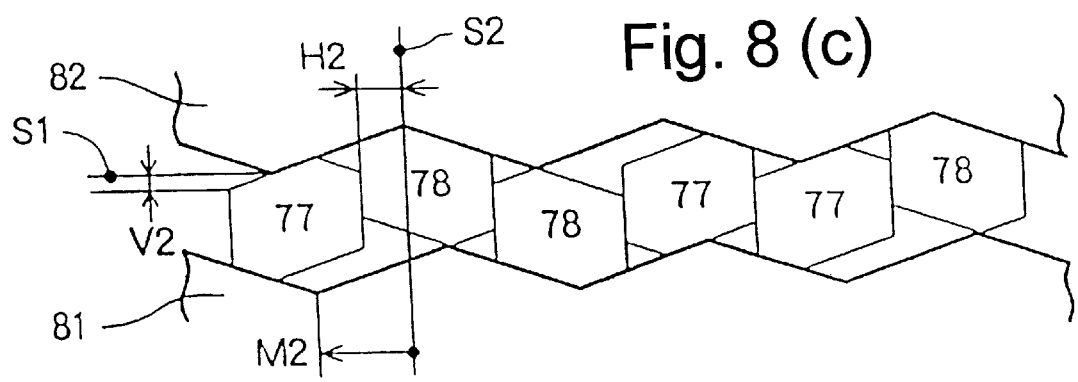
Figure 8:
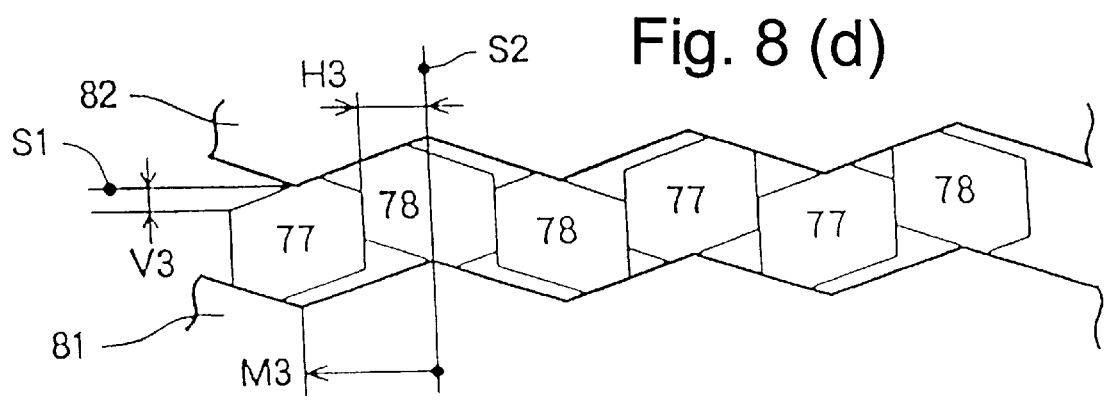

In FIG. 8(a), the input block 77 has a hexagonal shape, when developed, which is opposite in terms of left and right directions from the shape of the input block 78 being developed.

The left output cam 81 has an uneven cam surface 81b, which alternates connection of a left first inclining surface 81c and a left second inclining surface 81d.

The right output cam 82 has an uneven cam surface 82b, which alternates connection of a right first inclining surface 82c and a right second inclining surface 82d.

Here, S1, S2 are reference lines using a part of the right output cam 82 as a reference.

FIG. 8(b) shows a state in which, relative to the state shown in (a), upon receipt of a force in the circumferential direction (leftward in the drawing), the input block 77 moves from the right output cam 82 side to the left output cam 81 side by a distance V1, and also the right output cam 82 moves relatively in a direction opposite (rightward in the drawing) from the input block 77 by a distance H1, and the left output cam 81 moves leftward relative to the right output cam 82 by a distance M1.

FIG. 8(c) shows a state in which, relative to the state shown in (a), upon receipt of a force in the circumferential direction (leftward in the drawing), the input block 77 moves from the right output cam 82 side to the left output cam 81 side by a distance V2. The right output cam 82 moves relatively in a direction opposite from the input block 77 by a distance H2, and the left output cam 81 moves leftward relative to the right output cam 82 by a distance M2.

FIG. 8(d) shows a state in which, relative to the state shown in FIG. 8(a), upon receipt of a force in the circumferential direction (leftward in the drawing), the input block 77 moves from the right output cam 82 side to the left output cam 81 side by a distance V3. The right output cam 82 moves relatively in a direction opposite from the input block 77 by a distance H3, and the left output cam 81 moves leftward relative to the right output cam 82 by a distance M3.

As represented by the input block 77, described above, when the moving speed, or a rotating frequency, is different between the left output cam 81 and the right output cam 82, the input blocks 77, 78 undergo relative movement, or relative rotation, while causing a frictional force between the left and right output cams 81, 82, respectively.

When no difference is caused in rotation frequency between the left output cam 81 and the right output cam 82, the input blocks 77, 78 and the left and right output cams 81, 82 rotate together, rather than relative to one another.

The operation of the above-described differential will be described as follows.

FIGS. 9(a) and 9(b) are operation diagrams explaining the operation of a differential according to the present invention.

FIG. 9(a) is an enlarged diagram of the input block 77 (the leftmost one) and the left and right output cams 81, 82, shown in FIG. 8(a). In this figure, the inclination angle of the left first inclining surface 81c of the left output cam 81 is denoted as $\theta$, that of the right first inclining surface 82c of the right output cam 82 is denoted as $\theta$.

In FIG. 9(b), an example will be described in which, when a leftward force F is applied to the input block 77, for example, when the left output cam 81 rotates at a high speed, and the right output cam 82 rotates at a low speed, resulting in a difference in rotation frequency between the left output cam 81 and the right output cam 82. In this case, assume that if the input block 77 pushes the left first inclining surface 81c of the left output cam 81 with a force N perpendicular to the inclining surface 81c, and the right first inclining surface 82c of the right output cam 82 with a force N perpendicular to the inclining surface 82c, the leftward component of the force N is $N\sin\theta$.

Also, when the left output cam 81 moves leftward relative to the input block 77, a frictional force $\mu N$ is caused between the input block 77 and the left first inclining surface 81c, in which a rightward component of the frictional force $\mu N$ is $N\cos\theta$. A leftward component is $-\mu N\cos\theta$.

Therefore, a leftward force applied from the input block 77 to the left output cam 81 is $N\sin\theta - \mu N\cos\theta$.

On the other hand, when the right output cam 82 moves rightward relatively to the input block 77, a frictional force $\mu N$ is caused in the input block 77 and the right first inclining surface 82c, in which a leftward component of the frictional force $\mu N$ is $\mu N\cos\theta$.

Therefore, a leftward force applied from the input block 77 to the right output cam 82 is $N\sin\theta + \mu N\cos\theta$.

As described above, when a difference in a rotation frequency is caused between the left output cam 81 and the right output cam 82, a larger force is caused to the right output cam 82, which rotates at a lower speed, compared to the force caused to the left output cam 81, which rotates at a high speed.

The ratio of leftward forces applied to the left output cam 81 and the right output cam 82 are denoted as:

$$(N \sin \theta - \mu N \cos \theta):(N \sin \theta + \mu N \cos \theta) = (\sin \theta - \mu\cos \theta):(\sin \theta + N \cos \theta),$$ which varies depending on a friction coefficient $\mu$ and an inclination angle $\theta$.

The above ratio is ultimately a ratio at which to distribute driving torque to the left and right front wheels.

As described with reference to FIG. 4, in this embodiment, a differential case assembly 50 comprises: a plurality of input blocks 77, 78 for moving in a circumferential direction, following the rotating ring gear 75a; two left and right output cams 81, 82 for sandwiching the blocks 77, 78 so as to allow them to perform relative movement, and capable of rotating independently by utilizing a frictional force with the respective blocks 77, 78; and, a differential case 71 for storing the input blocks 77, 78 and left and right output cams 81, 82.

In the above structure, driving torque can be distributed to the output cams 81, 82 variably according to a predetermined ratio, depending on a frictional force direction, which varies due to relative sliding of the input blocks 77, 78 and the output cams 81, 82 based on the rotation frequency of the two output cams 81, 82. Thus, even though a driving force for some wheels becomes smaller due to a change in a friction coefficient of a road surface, a driving force for other wheels does not decrease, so that total driving force can be ensured and traveling performance can be improved.

Next, the distribution of a driving force when a saddled vehicle equipped with a differential runs along a straight path will be described.

Figure 10:
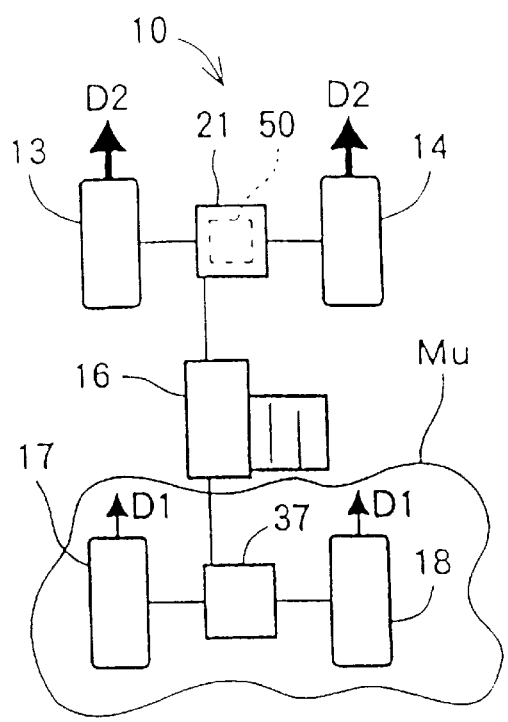
FIGS. 10(a) and 10(b) are diagrams showing driving force distribution by a saddled vehicle equipped with a differential according to the present invention, running in a straight direction.
Figure 10:
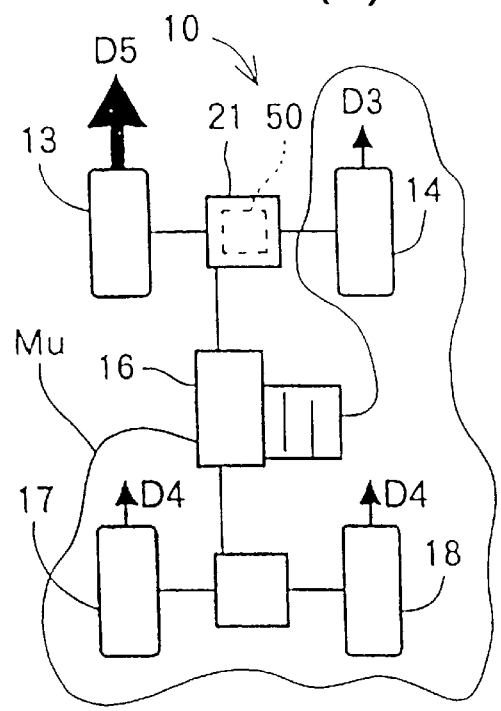

FIGS. 10(a) and 10(b) are operation diagrams illustrating the distribution of a driving force when a saddled vehicle equipped with a differential of the present invention runs along a straight path. For the purposes of illustration, the length of the black arrows in the drawing indicates the magnitude of a driving force.

In FIG. 10(a), when the rear wheels 17, 18 traverse a road with a small friction coefficient, such as on mud Mu, for example, the rear wheels 17, 18 slip, so that driving forces D1, D1 become smaller, as shown by the arrow. However, if the front wheels 13, 14 traverse a road with a large friction coefficient, large driving forces D2, D2, as shown by the arrow, result.

In FIG. 10(b), when the vehicle is running straight, if, e.g., the right front wheel 14 and the rear wheels 17, 18 traverse a road with a small friction coefficient, such as mud Mu, and so on, a driving force D3 of the right front wheel 14 and driving forces D4, D4 of the rear wheels 17, 18 become smaller, as shown by the arrows. However, if the left front wheel 13 traverses a road with a large friction coefficient, a difference in a rotation frequency will be caused between the left front wheel 13 and the slipping right front wheel 14. As a result, a large driving force D5, as shown by the arrow, will be caused in the left front wheel 13 due to operation of the front final assembly 21.

Next, a steering force of a saddled vehicle equipped with a differential will be described.

Figure 11:
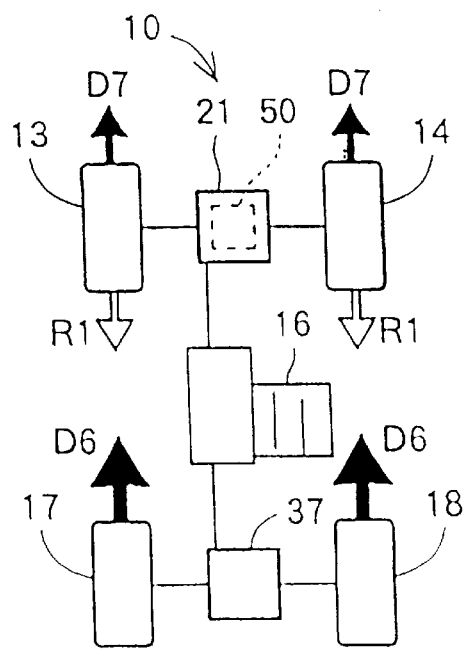
FIGS. 11(a) and 11(b) are diagrams showing a steering force of a saddled vehicle equipped with a differential according to the present invention.
Figure 11:
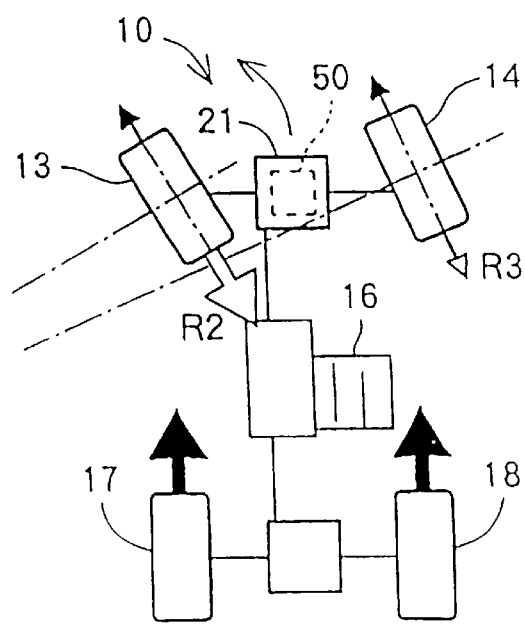

FIGS. 11(a) and 11(b) are operating diagrams illustrating a steering force of a saddled vehicle equipped with a differential according to the present invention. The length of black arrows in the drawing corresponds to the magnitude of a driving force, and the length of the outlined arrows corresponds to the magnitude of a resistance force when the vehicle is running.

In FIG. 11(a), in a saddled vehicle of the present invention, a rotation frequency for the rear wheels 17, 18 is set slightly higher than that for the front wheels 13, 14, for reduction of a steering force.

In this arrangement, when the vehicle is running straight, although the driving forces D6, D6 for the rear wheels 17, 18 become larger, as shown by the black arrows, driving forces D7, D7 for the front wheels 13, 14 become smaller, as shown by the black arrows. The resistance forces R1, R1 are caused to the front wheels 13, 14, as shown by the outlined arrows.

In FIG. 11(b), when the front wheels 13, 14 are steered while the vehicle is running, a larger resistance force R2 is caused in the front wheel 13, which then runs inside, than a resistance force R3, caused in the front wheel 14, which then runs outside. This is due to a slightly higher rotation frequency set for the rear wheels 17, 18 than the front wheels 13, 14, and of an operation of the front final assembly 21. This enables a reduction of a steering force.

Figure 12:
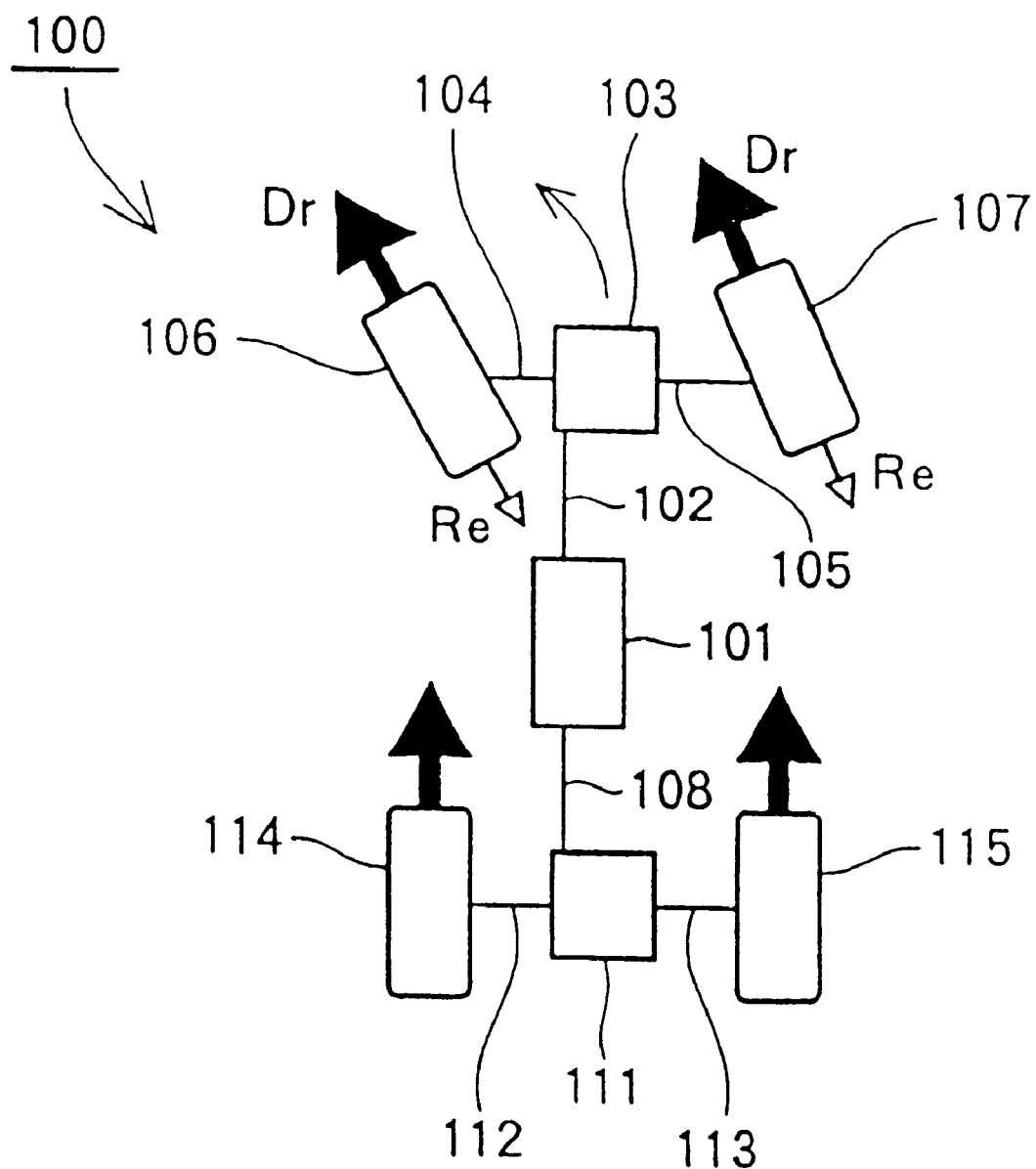
FIG. 12 is an operation diagram comparing steering forces of a vehicle equipped with a differential.

FIG. 12 is an operation diagram explaining a comparative example of steering forces of a vehicle equipped with a differential, in which the differential distributes equal driving forces to the right and left front wheels to be steered. The length of the black arrows in the drawing corresponds to the magnitude of a driving force, while the length of outlined arrows corresponds to the magnitude of a resistance force.

The vehicle 100 transmits a driving force of the power unit 101 to the differential 103 via the front shaft 102, and further from the differential 103 to the front wheels 106, 107 via the front drive shafts 104, 105.

The vehicle 100 also transmits a driving force of the power unit 101 to the differential 111 via the rear shaft 108, and further from the differential 111 to the rear wheels 114, 115 via the left and right rear drive shafts 112, 113.

In the vehicle 100, as the front wheels 106, 107 and the rear wheels 114, 115 rotate at the same rotation frequency, and the differential 103 distributes equal driving forces, driving forces Dr, Dr for the left and right front wheels 106, 107 become equal when being steered. Moreover, even if a rotation frequency of the rear wheels 114, 115 is set slightly higher than that for the front wheels 106, 107, resistance forces Re, Re applied to the left and right front wheels 106, 107, become equal, and no contribution to reduction of a steering force is thus obtained.

In the embodiment as described with reference to FIG. 11(b), in a saddled vehicle 10 equipped with a differential case assembly 50 between the front left and right wheels 13, 14, a device which distributes driving forces differently at a predetermined ratio to the left and right wheels 13, 14, when a difference is caused in rotation frequencies between the left and right wheels 13, 14, is employed as a differential case assembly 50.

In the above structure, when steering, a larger driving torque can be distributed to an inside wheel running at a slower speed than an outside wheel, whereby a larger resistance force is applied to the inside wheel than the outside wheel. As a result, steering performance can be further improved and a steering force can be further reduced The operation of the breather structure of the above-described front final assembly will next be described.

Figure 13A:
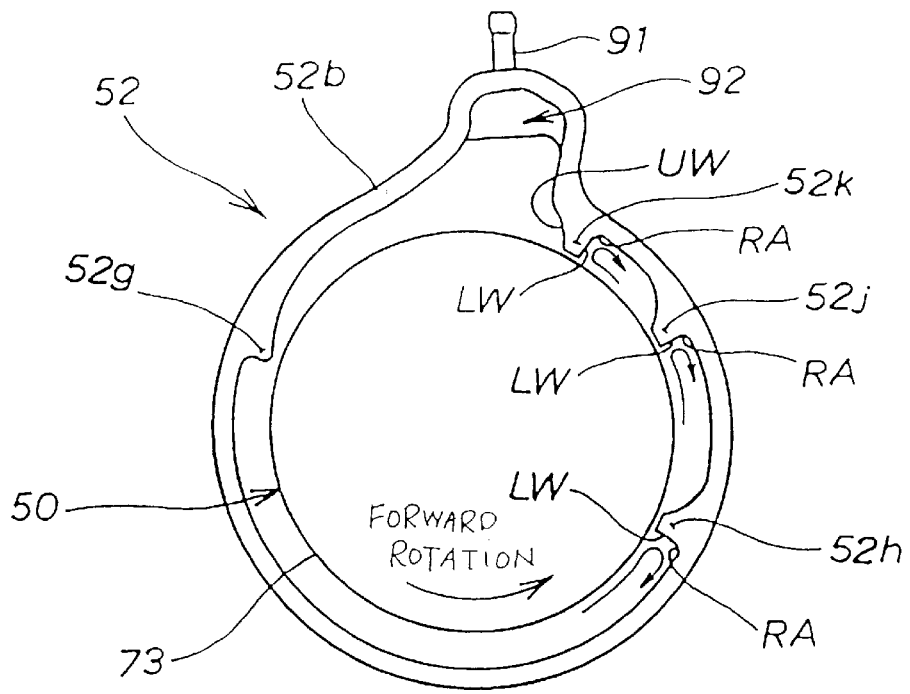
FIGS. 13(a) and 13(b) are diagrams showing the operation of a breather structure of a front final assembly equipped with a differential according to the present invention.
Figure 13B:
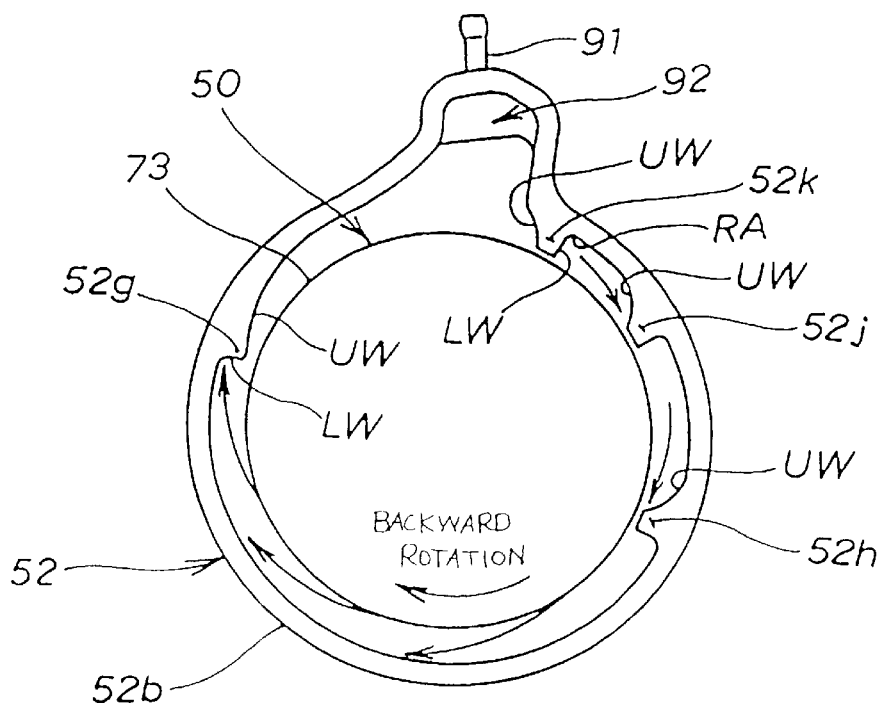

FIGS. 13(a) and 13(b) are operating diagrams illustrating the operation of a breather structure of a front final assembly equipped with a differential of the present invention.

In FIG. 13(a), when the differential case assembly 50 rotates forward as shown by the arrow, oil in the housing 52 tends to flow counterclockwise in a space between the external circumferential surface of the differential case assembly 50 and the inner surface of the housing cover 52b, following the rotation of the differential case assembly 50. However, the oil flow is blocked by the oil stop ribs 52h, 52j, 52k.

When the differential case assembly 50 rotates at a lower rotation frequency, most of the oil is blocked by the oil stop rib 52h provided upstream of the oil flow, so that the blocked oil accumulates in a lower part of the housing cover 52b, or between the two oil stop ribs 52g, 52h.

When the differential case assembly 50 rotates at a higher rotation frequency, a lot of oil passes through the space between the differential case assembly 50 and the oil stop rib 52h. The passed oil is then blocked by the oil stop rib 52j, and accumulates between two oil stop ribs 52h, 52j.

When the differential case assembly 50 rotates at an even higher rotation frequency, a lot of oil passes through the space between the differential case assembly 50 and the oil stop rib 52j. The passed oil is then blocked by the oil stop rib 52k, and accumulates between the oil stop ribs 52j, 52k, so that the oil can be prevented from flowing into the breather chamber 92.

As described above, provision of a plurality of oil stop ribs 52g, 52h, 52j, 52k, enables oil blocking in a broad range of rotation frequency of the differential case assembly 50.

Also, irregular intervals between the adjacent oil stop ribs 52g, 52h, 52j, 52k enables blocking and accumulation of a lot of oil upstream of the oil flow, compared to a design having regular intervals. The amount of oil to be blocked downstream of the oil flow can therefore be reduced. In particular, it is difficult for oil to overflow from between the oil stop ribs 52j, 52k, and can be prevented from flowing into the breather chamber 92.

Further, as the walls LW of the oil stop rib 52h, 52j, 52k, further from the breather chamber 92, are formed sharply rising, with corners RA having a small arc radius, oil can be reliably blocked.

In FIG. 13(b), when the differential case assembly 50 rotates in a direction opposite from a forward direction, i.e., in a reverse direction, as shown by the arrow, the oil in the housing 52 then flows clockwise, following the rotation of the differential case assembly 50, in a space between the external circumference surface of the differential case assembly 50 and the inner surface of the housing cover 52b.

When the walls UW of the oil stop ribs 52h, 52j, 52k, closer to the breather chamber 92, are formed declining having a large arc radius, the oil around the respective oil stop ribs 52h, 52j, 52k can be smoothly introduced to the respective spaces between the differential case assembly 50 and the oil stop ribs 52h, 52j, 52k. Oil can therefore flow toward the lower part of the housing cover 52b.

As the oil reaching the lower part of the housing cover 52b moves from the differential case assembly 50 side to the housing cover 52b side due to centrifugal forces, while flowing clockwise, as shown by the arrow, the oil can be efficiently blocked by the wall LW of the oil stop rib 52g.

As described above with reference to FIGS. 13(a) and (b), when the differential case assembly 50 rotates forward, an amount of oil to be blocked can be reduced as the differential case assembly 50 rotates at a higher rotation frequency, so that oil can be reliably blocked from flowing into the breather chamber 92.

Therefore, oil leakage to the outside of the front final assembly can be prevented.

Also, when the differential case assembly 50 rotates forward, the climbing oil can be received by the walls LW, or receiver surfaces, of the oil stop ribs 52h, 52j, 52k, to thereby block the oil flowing. Thus, it is possible to make the oil to accumulate in the lower part of the housing 52.

On the other hand, when the differential case assembly 50 rotates backward, the blocked oil flows downward along the declining walls UW of the oil stop ribs 52h, 52j, 52k, without accumulating on the walls UW. The flowing oil is then received by the wall LW of the oil stop rib 52g, or a receiving surface, to thereby block the oil flow.

Therefore, oil does not reach the breather chamber 92 when the differential case assembly 50 rotates either forward or backward, so that oil can be prevented from flowing to the outside of the front final assembly via the breather joint 91. As a result, the life of the front final assembly can be prolonged.

The present invention with the above arrangement can produce the following advantages:

A plurality of oil stop ribs are provided on an inner circumferential surface of the housing to prevent oil having been scooped by the differential from flowing into the breather chamber, and adjacent oil stop ribs are provided at irregular intervals.

When the oil stop ribs are formed on the housing, the need to provide additional parts for oil stoppage on the housing is eliminated, so that the number of parts, as well as cost, can be reduced, and noise or damage due to vibration can be reduced.

When adjacent oil stop ribs are provided at differing intervals, an amount of oil to be blocked can be gradually reduced as the differential rotates at a higher rotation frequency, so that the oil can be reliably prevented from flowing into the breather chamber. Thus, oil leakage to the outside of the final reduction gear can be prevented.

The upper surface of the oil stop rib may be formed declining and the lower surface thereof formed as a receiving surface. With this arrangement, oil does not sump on the upper surface of the oil stop rib. Moreover, as an oil flow is blocked by the lower surface of the oil stop rib, the oil can sump in the lower part of the housing. Thus, oil does not flow into the breather chamber, and so the oil can be prevented from flowing to the outside of the final reduction gear via the breather pipe.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A housing for storing a differential case assembly for a reduction gear, the housing comprising:

a breather chamber, the breather chamber having an aperture for communication with an outside of the chamber; and a plurality of ribs disposed along an interior of the housing, the ribs being disposed along the interior of the housing at nonuniform intervals between successive ribs, each of said ribs further including an arcuately shaped upper surface, and a linearly shaped lower surface opposed to said arcuately shaped upper surface, said linearly shaped lower surface being disposed in a position normal to said the interior of the housing.

2. The housing of claim 1, wherein the housing has a rotation axis extending through its interior, the plurality of ribs being arranged about the rotation axis and each of said arcuately shaped upper surfaces of said ribs being curved with respect to a radial direction of said rotation axis.

3. The housing of claim 1, wherein the ribs are arranged along an inner arcuate surface of the housing.

4. The housing of claim 3, wherein the breather chamber is disposed at an upper portion of the housing, a first of the plurality of ribs being disposed proximate an edge of the breather chamber.

5. The housing of claim 4, wherein a second of the ribs is disposed a distance from the first rib, and a third rib is disposed a distance from the second rib, the distance between the first and second ribs being less than the distance between the second and third ribs.

6. The housing of claim 5, wherein the distance between a fourth rib and the third rib is greater than the distance between the second and third ribs.

7. The housing of claim 1, said arcuately shaped upper surfaces being generally disposed at a plurality of obtuse angles to an interior arcuate wall of the housing.

8. The housing of claim 1, wherein the breather chamber is disposed at an upper portion of the housing.

9. The housing of claim 1, wherein the ribs are integrally formed with the housing.

10. The housing of claim 1, wherein an upper surface of each rib forms a declining angle with respect to the interior of the housing to facilitate flow of oil to a lower surface of a respective rib.

11. The housing of claim 10, wherein the lower surfaces of the ribs are configured and arranged to serve as receiving surfaces for rising oil.

12. The housing of claim 1, further comprising a cover.

13. A breather structure for a differential case assembly for a reduction gear, the reduction gear including a housing, the breather structure comprising:

a plurality of ribs disposable along an interior of the housing, the ribs being disposed along the interior of the housing at nonuniform intervals between successive ribs, each of said ribs further including an arcuately shaped upper surface, and a linearly shaped lower surface opposed to said arcuately shaped upper surface, said linearly shaped lower surface being disposed in a position normal to said the interior of the housing.

14. The breather structure of claim 13, wherein the distance between successive ribs increases with each successive rib.

15. The breather structure of claim 14, further comprising an aperture for connecting an interior of the housing to an outside of the housing.

16. The housing of claim 2, further comprising a first rib being disposed proximate to said breather chamber;

a second rib being disposed a distance from the first rib;

a third rib being disposed a distance from the second rib; and a fourth rib being disposed a distance from the third rib, a distance between the first and second ribs being less than a second distance between the second and third ribs and a third distance between said third and fourth ribs being greater than said second distance.

17. The housing of claim 16, wherein a first angle being formed between said fourth and third ribs with respect to said rotation axis is greater than a second angle being formed between said second and third ribs with respect to said rotation axis.

18. The housing of claim 17, wherein a third angle being formed between said first and second ribs with respect to said rotation axis is less than said second angle.

* * * * *